April 10, 1962 L. T. KING ETAL 3,029,095
FLANGE CONNECTING CLAMP
Filed Aug. 18, 1955 2 Sheets-Sheet 1
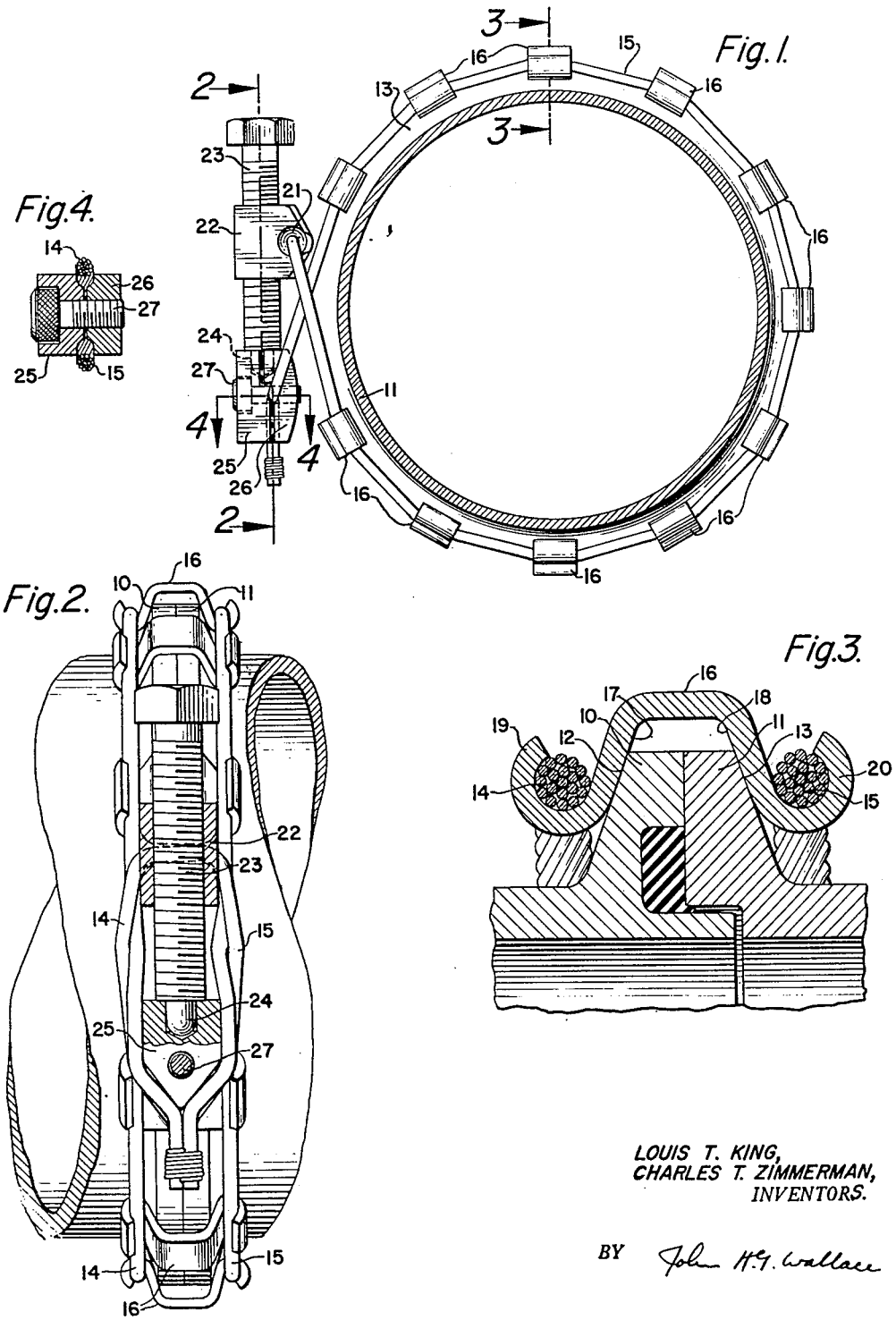
LOUIS T. KING,
CHARLES T. ZIMMERMAN,
INVENTORS.
BY John H.G. Wallace

LOUIS T. KING,
CHARLES T. ZIMMERMAN,
INVENTORS.

BY John H.T. Wallace

United States Patent Office 3,029,095
Patented Apr. 10, 1962

3,029,095
FLANGE CONNECTING CLAMP
Louis Thayer King and Charles T. Zimmerman, Phoenix, Ariz., assignors to The Garrett Corporation, Los Angeles, Calif., a corporation of California
Filed Aug. 18, 1955, Ser. No. 529,201
6 Claims. (Cl. 285—411)

The present invention relates to a clamp for connecting flanges, and more particularly to a clamp adapted for installation on flanges located in limited spaces such as those found in crowded aircraft structures.

Objects located close to conduit connection flanges, for example, sometimes hinder the installation of connecting clamps thereon, or render the installation of conduits and connected equipment very difficult.

The foregoing difficulties are aggravated by clamp structures which are not sufficiently flexible to permit the clamp to be straightened out. Rigid, or rigid segment, clamps interfere with objects located close to conduit flanges during the installation of the clamp. Clamps having partially rigid structures usually require a connection and take-up mechanism employing a plurality of pivoted and screw-threaded elements which complicate the construction and operation of the clamp. Clamps having rigid, arcuate, flange-engaging members sometimes fail to provide uniform clamping forces around the flange peripheries, due to slight differences in radii of the rigid clamp elements and of the flanges engaged thereby.

It is an object of the present invention to provide a conduit connection clamp which is composed of a pair of flexible cables and a plurality of spaced flange-engaging saddles interconnecting the same, whereby the clamp may be readily straightened out and threaded into position for installation on flanges located in very confined spaces.

Another object of the invention is to provide a conduit connection clamp which, due to its flexible construction, is capable of conforming to flanges which may be machined to liberal tolerances.

Another object of the invention is to provide a conduit connection clamp employing a pair of cables and spaced saddles interconnecting the cables whereby the spaced saddles engage the flanges and apply clamping pressure uniformly thereabout.

Another object of the invention is to provide a conduit connection clamp which is very light in weight in proportion to its clamping ability.

Another object of the invention is to provide a conduit connection clamp which may be positioned on flanges having a variety of peripheral configurations.

Another object of the invention is to provide a conduit connection clamp having tension elements composed of cables with which a very simple take-up or clamp-tightening mechanism may be employed.

Another object of the invention is to provide a conduit connection clamp wherein saddles, interconnecting a pair of cables, extend over flanges and are engaged by the cables adjacent to inclined surfaces of the flanges, whereby the cables when tightened exert axial components of force on the inclined surfaces of the flanges inwardly of the peripheries thereof, tending to draw the flanges tightly together.

Other objects and advantages of the invention will be apparent from the following specification, appended claims, and accompanying drawings in which:

FIG. 1 is a cross-sectional view of a conduit, showing a clamp constructed in accordance with the present invention and disposed in engagement with flanges on the conduit;

FIG. 2 is an enlarged fragmentary sectional view taken from the line 2—2 of FIG. 1;

FIG. 3 is an enlarged fragmentary sectional view taken from the line 3—3 of FIG. 1;

FIG. 4 is an enlarged sectional view taken from the line 4—4 of FIG. 1;

Figure 5:
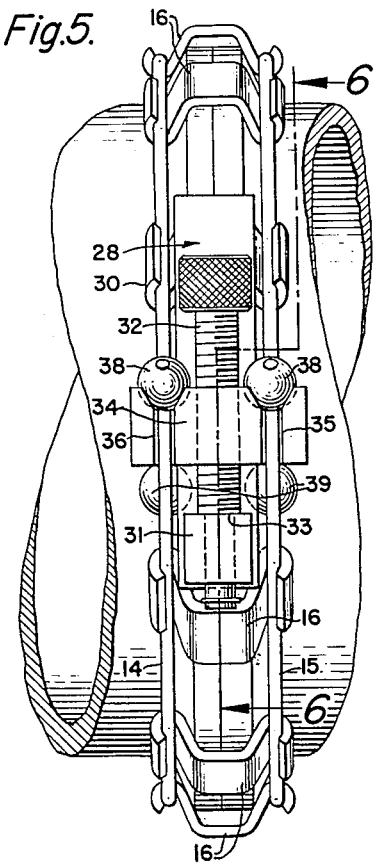
FIG. 5 is an elevational view of flange means connected by a modified clamp constructed in accordance with the present invention.

The present invention is applicable for use in connecting flanges in a variety of installations and has particular advantages when installed on flanges located in crowded areas where various objects are close to the flanges. In aircraft, conduits and valves are disposed in extremely compact and crowded structures. The present clamp, due to its flexible structure, may be readily installed on flanges which are very close to adjacent objects or structures. The cable and saddle structure of the clamp may be installed by projecting or pulling it around a pair of flanges in a snake-like fashion. This mode of installation is advantageous in close quarters where a person's hands, or appropriate tools, may not be inserted. In addition, the flexibility of the clamp permits it to be straightened or twisted and maneuvered around structures and into position during installation on flanges.

Referring to FIGS. 1 and 3 of the drawings, it will be seen that the conduit connection clamp, according to the present invention, is positioned on flange structures 10 and 11 for holding the same together. These flange structures 10 and 11 are individually connected to conduit sections. The flanges 10 and 11 are provided with conventional annular inclined clamp engaging surfaces 12 and 13, respectively.

The present clamp is provided with a pair of cables 14 and 15 which are interconnected by saddles 16. These saddles 16 are provided with diverging surfaces 17 and 18 disposed in engagement with the inclined surfaces 12 and 13 of the flanges 10 and 11. The saddles 16 near their opposite end portions are provided with hook-shaped clip portions 19 and 20 in which the cables 14 and 15, respectively, are engaged. These clip portions 19 and 20 may be clamped onto the cables 14 and 15 for fixing the saddles 16 in spaced relationship to each other on the cables 14 and 15, whereby a unitary flexible assembly of the saddles and cables is provided.

With reference to FIG. 3 of the drawings, it will be seen that the cables in connection with the clip portions of the saddles 16 are disposed to exert an axial component of force on the inclined surfaces of the flanges 10 and 11 inwardly of their peripheries or extremities. The cables 14 and 15, as shown in FIGS. 1 and 2 of the drawing, are formed from a single cable extending through a bore 21 in an internally screw-threaded nut 22 which is threaded on a bolt 23. An end 24 of the bolt bears on a block 25 to which the ends of the cables 14 and 15 are clamped by means of a clamp plate 26 and a screw 27.

In operation, the bolt 23 is rotated within the nut 22 which tends to separate the nut and block 25, whereupon the cables 14 and 15 are tightened around the flanges 10 and 11. Tightening of the cables tends to force the saddles 16 into very intimate and snug relationship with the inclined surfaces 12 and 13 of the flanges 10 and 11. Due to the inclination of the surfaces 12 and 13 of the flanges, axial components of force are exerted by the saddles 16 on the flanges tending to force them together.

When installing the present clamp on the flanges 10 and 11, the block 25 and plate 26 are inserted between the cables 14 and 15 adjacent to the nut 22. The end 24 of the bolt 23 is then engaged with the block 25, whereby subsequent rotation of the bolt 23 relative to the nut 22 and block 25 causes the nut 22 and block 25 to be forced apart, which tightens the cables 14 and 15 and the saddles 16 relative to the flanges 10 and 11.

Figure 6:
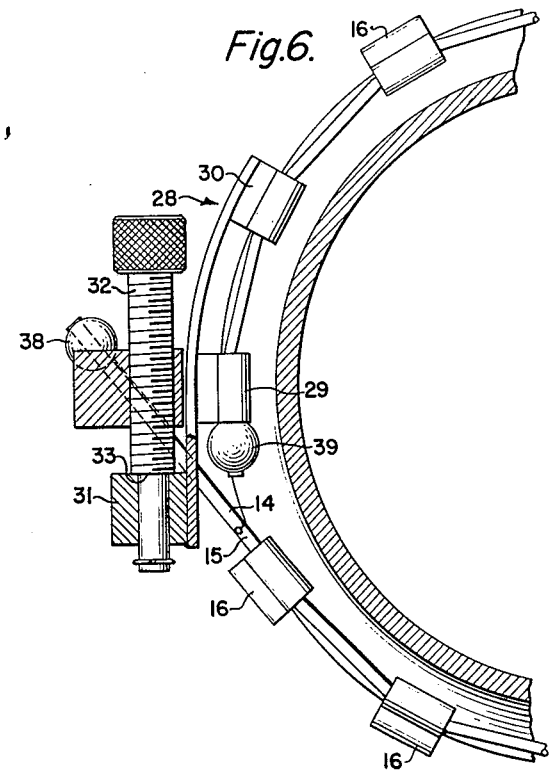
FIG. 6 is a fragmentary partially sectional view of the modified clamp taken from the line 6—6 of FIG. 5.

In the modification of the present invention, depicted in FIGS. 5 and 6 of the drawings, there is shown a very simple clamp connection and tightening mechanism. An end fitting 28 is provided with saddle portions 29 and 30, which are similar in construction to the saddles 16. Integral with the saddle portions 29 and 30 is a bolt supporting block portion 31 on which the bolt 32 is rotatably supported. The bolt 32 is provided with an abutment shoulder 33 engaging the block portion 31. Screw threaded on the bolt 32 is a nut 34 having slots 35 and 36 which are arranged to receive the cables 14 and 15. Swaged on the ends of the cables 14 and 15 are abutment fittings 38. These abutment fittings 38 engage conforming recesses located in the nut 34 at the ends of the slots 35 and 36 whereby the nut 34 acts as an abutment member. Similar abutment fittings 39 are fixed to the opposite ends of cables 14 and 15 and abut the saddle portion 29 which also acts as an abutment member.

In installation of the clamp, the ends of the cables 14 and 15, carrying the abutment fittings 38, may be snaked around the flanges 10 and 11. When the saddles 16, 29, and 30 are in proper position, the ends of the cables 14 and 15 are placed in slots 35 and 36, and the abutment fittings 38 are seated in conforming recesses at the ends of the slots 35 and 36. Subsequent rotation of the bolt 32 relative to the block 31 and nut 34 forces the nut away from the block 31, causing the cables 14 and 15 to be tightened about the saddles 16 and the flanges which they engage.

It will be apparent to those skilled in the art that a clamp according to the present invention may be used for a wide variety of purposes other than for joining conduits together. For example, such a clamp finds utility in detachably securing generators, starting motors and other accessory machines or parts to the driving pads of aircraft engine gear or crankcases.

We claim:

1. In a clamp for connecting conduit flanges, spaced flexible cable elements arranged to surround structure adjacent to said conduit connecting flanges; a plurality of flange-engaging saddles spaced longitudinally of and interconnecting said cable elements, said saddles having a pair of connected diverging portions disposed to engage and force the pair of flanges together; cable engaging portions on said saddles integral with and disposed at the free ends of flange engaging portions, said cable elements and said saddles being connected together to form a unitary flexible assembly; and means for connecting and tightening said cable elements and said saddles on said flanges.

2. In a clamp for connecting conduit flanges, spaced flexible cable elements arranged to surround structure adjacent to said flanges; a plurality of flange-engaging saddles spaced longitudinally of and interconnecting said cable elements, said saddles having a pair of connected diverging portions disposed to engage and force the pair of flanges together; clip portions integral with the free ends of said flange engaging portions, said clip portions partially surrounding said cable elements for connecting said cable elements and said saddles in a unitary flexible assembly; and means for connecting and tightening said cable elements and said saddles on said flanges.

3. In a clamp for connecting a pair of flange elements of the type having inclined surfaces extending inwardly from the peripheries, the combination of a pair of spaced flexible cable elements disposed to surround structure adjacent to said flanges; a plurality of flange-engaging saddles spaced longitudinally of and interconnecting said cable elements, each of said saddles having a pair of diverging flange-engaging portions disposed to force said flanges together, said saddles having clip portions extending from opposite ends thereof, said clip portions being located adjacent to said inclined surface and disposed inwardly of the peripheries of said flanges, said clip portions being fixed to said cables for connecting them with said saddles in a unitary flexible assembly; and means for connecting and tightening said cable elements and said saddles on said flanges.

4. In a clamp for connecting a pair of flanges having inclined surfaces extending inwardly from the peripheries thereof, the combination of a pair of spaced flexible cable elements disposed to surround structure adjacent to said inclined surfaces; a plurality of flange-engaging saddles spaced longitudinally of and interconnecting said cable elements, said saddles each having a pair of diverging portions disposed to engage and force said flanges together; hook-shaped clip portions on opposite ends of each saddle, said clip portions being located adjacent to said inclined surfaces and disposed inwardly of the peripheries of the flanges, said clip portions partially surrounding said cable elements and clamped thereon for connecting said cable elements and said saddles in a unitary flexible assembly; and means for connecting and tightening said cable elements and said saddles on said flanges.

5. A clamp for connecting a pair of abutting flange elements of the type having inclined outer surfaces extending inwardly from their peripheries comprising: a pair of spaced flexible cable elements disposed to surround structure adjacent to said flanges; a plurality of spaced flange-engaging saddles interconnecting said cable elements, each of said saddles having a pair of diverging portions disposed to engage and force said flanges together, said saddles having clip portions extending outwardly from opposite ends thereof, said clip portions being located adjacent to the inclined surfaces of the flanges inwardly of the peripheries thereof and being fixed to said cables for connecting them with said saddles in a unitary flexible assembly; and means for connecting and tightening said cable elements and said saddles on said flanges.

6. A clamp for connecting flanges as described in claim 1 wherein said means for connecting and tightening said cable elements and said saddles on said flanges includes relatively movable block and nut members secured to corresponding ends of said cables and detachably connected to the opposite ends thereof.

References Cited in the file of this patent

UNITED STATES PATENTS

| 184,599 | Ehrhardt | Nov. 21, 1876 |
| 1,468,297 | Hogg | Sept. 18, 1923 |
| 1,857,847 | Heinemann | May 10, 1932 |
| 2,497,467 | Peters | Feb. 14, 1950 |
| 2,653,836 | Christophersen | Sept. 29, 1953 |

FOREIGN PATENTS

| 389,787 | Germany | Feb. 7, 1924 |
| 591,284 | Great Britain | Aug. 13, 1947 |